(12) United States Patent
Benson et al.

(10) Patent No.: US 12,189,355 B2
(45) Date of Patent: Jan. 7, 2025

(54) ENERGY SYSTEM PERFORMANCE MANAGER

(71) Applicant: Microbeam Technologies, Inc., Grand Forks,, ND (US)

(72) Inventors: Steve Benson, Victoria, MN (US); Shuchita Sanjay Patwardhan, Ntuley, NJ (US); David John Stadem, Grand Forks, ND (US); James Fredrick Langfeld, Chisolm, MN (US)

(73) Assignee: Microbeam Technologies, Inc., Grand Forks, ND (US)

( * ) Notice: Subject to any disclaimer, the term of this patent is extended or adjusted under 35 U.S.C. 154(b) by 83 days.

(21) Appl. No.: 17/654,478

(22) Filed: Mar. 11, 2022

(65) Prior Publication Data

US 2022/0291650 A1 Sep. 15, 2022

Related U.S. Application Data

(60) Provisional application No. 63/159,762, filed on Mar. 11, 2021.

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
None
See application file for complete search history.

(56) References Cited

U.S. PATENT DOCUMENTS

| | | | | |
|---|---|---|---|---|
| 5,818,899 A * | 10/1998 | Connolly | ............. | G01N 23/223 378/45 |
| 6,136,590 A * | 10/2000 | Kruse | ....................... | C05F 9/02 241/DIG. 38 |
| 7,006,919 B2 * | 2/2006 | Osucha | ................ | G01N 23/223 702/26 |
| 8,656,846 B2 * | 2/2014 | Osucha | ................... | F23N 5/184 110/106 |
| 10,538,716 B1 * | 1/2020 | Toberman | ................ | C10L 5/363 |
| 11,060,290 B1 * | 7/2021 | Rayman, Jr. | ............ | B32B 37/00 |
| 2007/0075870 A1 * | 4/2007 | McCauley | .............. | B29C 48/92 340/679 |
| 2007/0142975 A1 * | 6/2007 | Piche | ........................ | H02J 3/38 700/286 |
| 2007/0251432 A1 * | 11/2007 | Osucha | ................... | F23N 5/184 110/186 |
| 2008/0314802 A1 * | 12/2008 | Tuite | ........................ | B03C 1/16 209/241 |

(Continued)

*Primary Examiner* — Jason Lin
(74) *Attorney, Agent, or Firm* — DeWitt LLP (57) ABSTRACT

A system and method of improving facility performance and reliability includes the integrated use of feedstock property management, condition-based monitoring (CBM), neural network augmented predictions of the impacts of feedstock properties, and feedstock properties/plant operation databases used for machine learning applications. Sensors are used to identify feedstock properties and operating parameters throughout the facility. Understanding how feedstock properties impact facility performance over time allows the system to predict how feedstock properties will impact processing outputs so that adjustments to operating parameters may be made to improve facility performance.

20 Claims, 6 Drawing Sheets

(56) References Cited

U.S. PATENT DOCUMENTS

| | | | |
|---|---|---|---|
| 2009/0236268 A1* | 9/2009 | Shulman | B07C 5/344 |
| | | | 209/636 |
| 2010/0018113 A1* | 1/2010 | Bohlig | C10J 3/72 |
| | | | 44/550 |
| 2010/0038594 A1* | 2/2010 | Bohlig | C10J 3/72 |
| | | | 252/373 |
| 2010/0330517 A1* | 12/2010 | Osucha | F23K 1/00 |
| | | | 110/106 |
| 2011/0214341 A1* | 9/2011 | Nafid | C10L 5/46 |
| | | | 44/589 |
| 2012/0304536 A1* | 12/2012 | Bai | C10L 5/40 |
| | | | 44/589 |
| 2013/0192128 A1* | 8/2013 | Bai | C10L 9/10 |
| | | | 44/589 |
| 2019/0106637 A1* | 4/2019 | Oswald | C09D 17/003 |
| 2021/0276226 A1* | 9/2021 | Campbell | B29B 17/02 |

* cited by examiner

ENERGY SYSTEM PERFORMANCE MANAGER

CROSS-REFERENCE TO RELATED APPLICATIONS

This application claims priority to U.S. Provisional Application No. 63/159,762 filed Mar. 11, 2021, and titled Energy System Performance Manager, herein incorporated by reference.

GOVERNMENT SUPPORT CLAUSE

An invention of the present patent application has been made with government support under Contract No. DEFE0031547 awarded by the U.S. Department of Energy. The U.S. federal government has certain rights in the inventions disclosed in the present patent application.

TECHNICAL FIELD

The present application relates to the field of control systems and, in particular, to a control system for analyzing and sorting feedstock to control the output of a facility processing the feedstock.

BACKGROUND

There are many types of systems that process feedstock to provide energy and/or process waste. Feedstock for energy producing facilities may include coal, biomass, petroleum, or waste for example. The energy producing facility may be a combustion system such as a boiler or incinerator, a gasification or pyrolysis system or a conversion system, for example.

Combustion systems that use raw material as an input may include tangential and wall fired boilers or fluid bed boilers. Gasification systems may include entrained flow gasifiers that use processes of fuel blending, flux formulations, slag flow and deposition in vessels and syngas coolers. Waste energy systems may use incinerators or conversion systems like pyrolysis and gasification to process municipal and/or industrial waste.

Various properties of the feedstock supplied to an energy producing facility can have a large impact on the quality of the energy and the overall output of the facility.

SUMMARY

A system and method of improving facility performance and reliability includes the integrated use of feedstock property management, condition-based monitoring (CBM), neural network augmented predictions of the impacts of feedstock properties, and feedstock properties/plant operation databases used for machine learning applications. Sensors are used to identify feedstock properties and operating parameters throughout the facility. Understanding how feedstock properties impact facility performance over time allows the system to predict how feedstock properties will impact processing outputs so that adjustments to operating parameters may be made to improve facility performance.

In a first aspect, an embodiment of a method of processing feedstock for a facility providing an output includes detecting a plurality of first properties of the feedstock using one or more sensors; analyzing the first properties, using one or more computer processing devices, to characterize quantities of the feedstock; sorting the quantities of the feedstock into one or more bins based on the first properties associated with each quantity of feedstock; selecting the quantities of feedstock from one or more bins based on the first properties; processing the feedstock to generate energy; sensing a plurality of second properties of a performance of the facility when processing the feedstock; and providing the second properties as feedback to the one or more computer processing devices for use in detecting, analyzing, and sorting the feedstock.

In a second aspect, an embodiment of a system for processing feedstock for a facility providing an output includes first sensors for identifying a plurality of first properties of the feedstock; a processing device comprising a processor and a memory storing computer-executable instructions for execution by the processor for analyzing the first properties to characterize quantities of the feedstock; trippers for sorting the quantities of the feedstock into one or more bins based on first properties associated with each quantity of feedstock; a device for selecting and blending quantities of feedstock from the one or more bins based on the first properties; and second sensors for sensing a plurality of second properties of the feedstock as it is processed by the facility, wherein the second properties are provided to the processing device.

In any of the above embodiments, analyzing a feedstock includes processing both the first and second properties using a machine learning algorithm to predict performance of the facility. Further, the analyzing may include determining operational parameters of the facility and the machine learning algorithm may include a neural network. In embodiments, analyzing may also include accessing a database of feedstock properties.

In any of the above embodiments, selecting quantities of feedstock may include blending several quantities of feedstock. Further, blending several quantities of feedstock may include adding other materials to the feedstock.

In any of the above embodiments, the feedstock may be coal.

In any of the above embodiments, the feedstock may be residual materials feedstock.

In any of the above embodiments, the sensors may include a condition-based monitoring system for monitoring operating parameters at several locations in the facility.

In any of the above embodiments, the sensors may include multi-gamma attenuation sensors.

DETAILED DESCRIPTION

In embodiments, energy conversion systems are designed to run at a steady state to provide a consistent output of energy. However, changes in energy use have led to a system where energy conversion systems may need to cycle over time—higher and lower. For example, cycling may be influenced by combining traditional sources of energy with renewables, which tend to be more intermittent.

Coal-fired power plants, originally classified as "baseload" plants, are now required to vary their output to make room for increasing generation of renewable-based electricity—performing some of the tasks that diesel—or natural gas-fired "peaker" plants had been designed to perform. Power plant operators responsible for improving efficiency have therefore faced an objective shift from maximizing efficiency given a constant load (usually full load) to maximizing efficiency under a fluctuating load profile (load following). The introduction of a load profile introduces the potential for further optimization of a plant experiencing fluctuations in fuel properties. Operators may find gains in overall efficiency by matching different fuel properties to different load conditions while optimizing operations parameters.

Inputs to energy conversion systems, or feedstocks, may vary in composition and quality over time. In embodiments disclosed herein, an energy conversion system provides a mechanism for matching fluctuating feedstock inputs with a preferred variability of outputs. An additional challenge in managing feedstocks, especially for coal, is that discrete element and other particle-by-particle coal tracking methods are hampered by the scale of coal handling operations, which often operate on the scale of thousands of tons.

Figure 1:
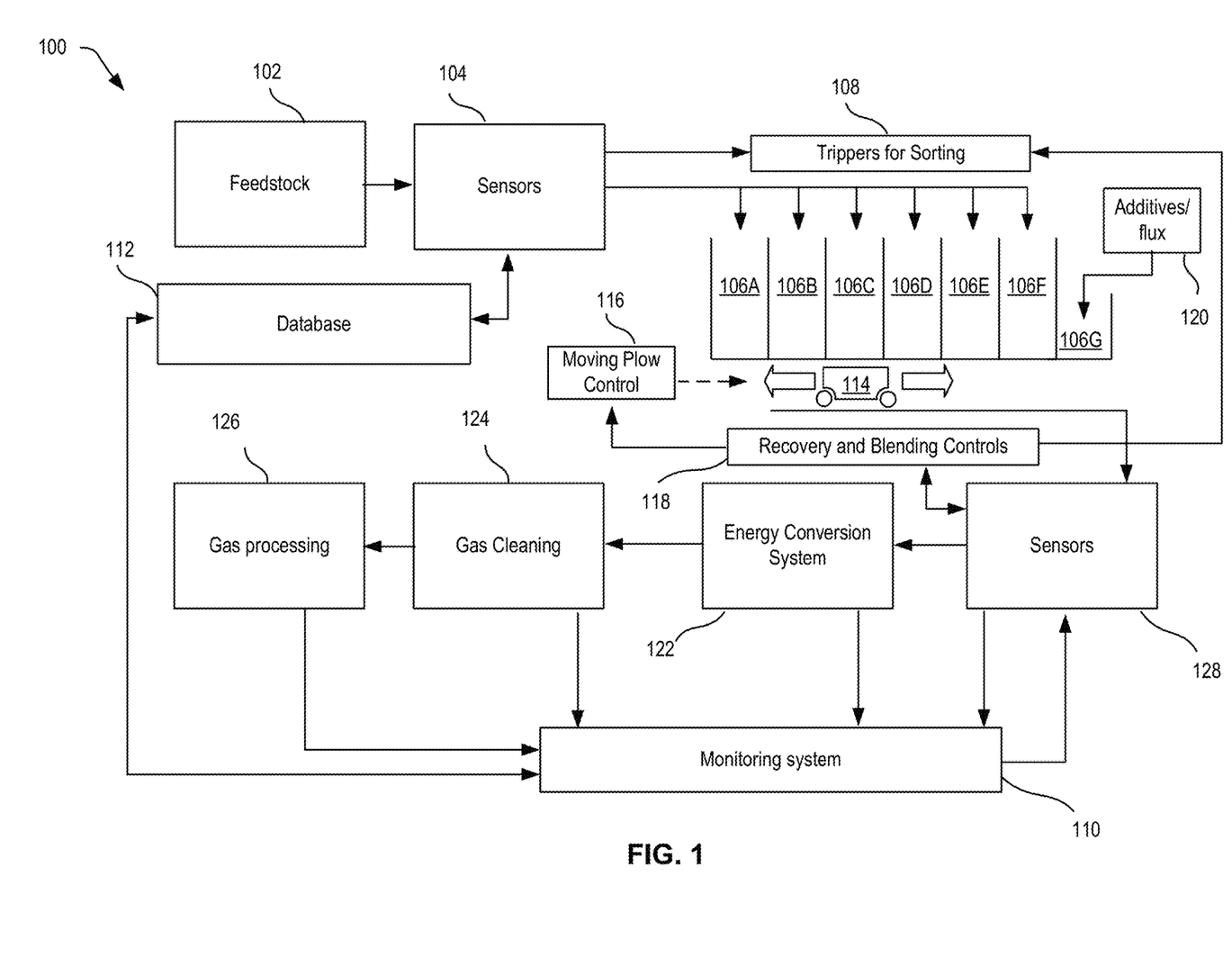
FIG. 1 is a block diagram of a system for energy performance management, in embodiments.

FIG. 1 is a block diagram of a system 100 for energy performance management, in embodiments. Energy is generated from feedstock 102, which may include various materials capable of being used to produce energy. System 100 may represent, for example, a coal-fired power plant, although other types of feedstock are contemplated. As feedstock 102 moves through system 100, it may be analyzed using sensors 104, then screened and sorted into bins 106A-106F using trippers 108. The term "bins" may refer to separate vessels containing feedstock materials, and/or distinct locations within a single vessel that contain feedstock materials. For example, bins 106A-106F may represent an open barn with coal falling from trippers 108 positioned above piles of coal in the open barn. Trippers 108 may be directed to any position along the length of the barn, allowing operations to direct the coal into different areas. Coal in the barn may be retrieved using moving plow 114, which may be directed to any position along the length of the barn to reclaim coal from different areas. In embodiments, trippers 108 may also direct coal into separate bins 106A-106F and moving plow 114 may be positioned underneath the bins to retrieve coal. Although six bins 106A-106F are shown in FIG. 1, this is for purposes of illustration and any number of bins or vessels may be used.

Various properties of feedstock 102 may be used for sorting the feedstock into bins 106A-106F. For example, coal feedstock may have a sodium or ash content that varies over several periods of time, including hours, days or weeks. Similarly, properties identified with sensors 104 may also be used while removing sorted feedstock 102 from any of bins 106A-106F to optimize performance of system 100. A moving plow 114 may be controlled by moving plow control system 116 to retrieve feedstock from bins 106A-106F. Moving plow 114 may also retrieve materials from bin 106G. Recovery and blending controls 118 may interact with moving plow control system 116 and trippers 108 to select sorted feedstock 102 from different bins 106A-106F. In embodiments, feedstock 102 from various bins may be blended while it is being removed from bins 106A-106F by combining feedstock 102 from two or more bins in moving plow 114. Further additives 120 such as limestone may be added through, for example, bin 106G to minimize negative aspects of the feedstock or optimize for a particular output of system 100. Moving plow 114 may be controlled to retrieve coal or other materials from any of bins 106A-106G.

Sensors 104 identify properties of feedstock 102 as it enters system 100, then provide them as inputs to database 112. Database 112 stores feedstock properties as well as performance indicators associated with feedstock properties that may be used to further process raw sensor data. For example, some material properties, such as impurity type, size, and composition, are difficult or non-cost effective to measure by sensors 104. Performance indicators stored in database 112 may be used to predict difficult to measure properties from measured properties.

Sensors 104 may be advanced sensors for property measurement screening and/or sorting analysis of feedstock 102, such as an online full stream elemental analyzer (FSEA). The utilization of an FSEA provides a significant advantage to the challenge of accurate sampling of large particles, such as large particle-size coal. An FSEA can be positioned in such a way that it continuously analyzes the entire stream of feedstock 102 in feedstock handling component, typically a belt. Sampling of the feedstock 102 can be rendered unnecessary, as the entire stream of the feedstock 102 is analyzed over time. In some aspects, a successful method of full-stream analysis of the feedstock 102 is an FSEA system that can optimize screening and sorting, provide input for blending, and combine that information with condition-based monitoring of plant performance to optimize plant operations. In some aspects, sensor 104 utilizes a prompt gamma neutron activation analysis (PGNAA). In some other aspects, sensor 104 utilizes multi-gamma attenuation (MGA).

Sorted feedstock 102 in moving plow 114 continues through system 100 past sensors 128 that measure various properties and validate the selected blend of sorted and selected feedstock. In embodiments, system 100 processes feedstock using a gasifier including, for example, energy conversion system 122, gas cleaning system 124 and gas processing system 126. Other types of processing facilities may be used, such as boilers or incinerators. Energy conversion system 122, gas cleaning system 124 and gas processing system 126 are also monitored with sensors 128 because their performance may be impacted by the properties of the feedstock 102. Sensors 128 may be positioned as appropriate in or around any of energy conversion system 122, gas cleaning system 124 and gas processing system 126, including inputs, outputs or internally. Sensors 128 may also be placed near conveyor belts or other transport devices in system 100. Outputs from sensors 128 are provided to monitoring system 110 and blending controls 118.

Sensors 128 may be advanced sensors for property measurement to validate the selected blend of sorted and selected feedstock, such as an online full stream elemental analyzer (FSEA). Sensors 128 can be used in combination with other sensors that measure feedstock handling properties, such as sensors 104. In some aspects, sensor 128 utilizes multi-gamma attenuation (MGA).

Monitoring system 110 receives data from devices and sensors of system 100 to perform analysis and provide control signals based on the analysis. Monitoring system 110 includes hardware and software for executing instructions stored in a non-transitory memory. Monitoring system 110 and database 112 may be combined in one apparatus or separated across several components.

Figure 2:
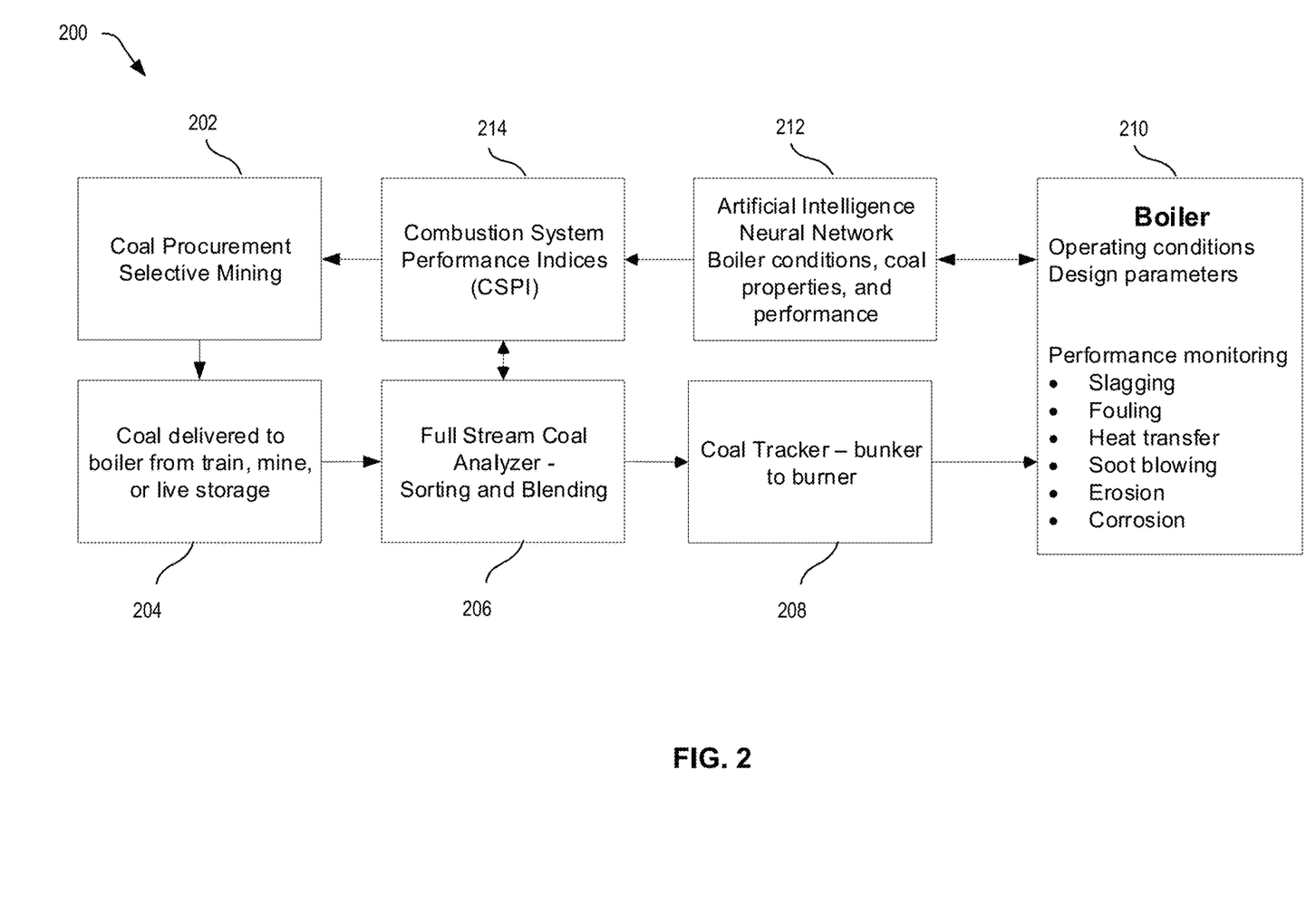
FIG. 2 is a schematic diagram of a workflow process of the system of FIG. 1, in embodiments.

FIG. 2 is a schematic diagram of a workflow process 200 of the system of FIG. 1, in embodiments. Although FIG. 2 illustrates an embodiment related to processing coal feedstock, any of the embodiments discussed herein may be used with a wide variety of feedstocks. Workflow process 200 includes components 204, 206, 208, 210, 212 and 214. In embodiments, any of the elements described herein may be combined or divided into further sub-processes. Although described individually and sequentially, some sub-processes may be performed in a different order or at the same time.

Workflow process 200 begins with procuring the coal. At component 202, coal is procured through mining, which may be selectively performed to optimize various properties of the coal. The inherent variation within a single coal seam and between coal seams produces measurable fluctuations in coal properties such as ash content and mineral constituents. Some of the factors that impact coal properties include drill core spacing and the dilution of the coal with respect to the roof, floor, and partings of a seam.

At component 204, coal feedstock procured at 202 is delivered to a coal-fired power plant. In embodiments, system 100 is an example of a coal-fired power plant. Coal may be transported and processed through a variety of mechanisms including trains and conveyer belts. At various stages of the process, coal may pass through vessels or silos, for example, or be moved by plows, trippers, and other mechanisms.

Ideally, the residence time of coal particles flowing through a vessel such as a coal silo is consistent, and the process can be described as exhibiting laminar flow. In practice, laminar flow rarely occurs. Key challenges to coal tracking are mixing of different coals through the system and non-laminar flow of solids through the system. These processes can be influenced by moisture, particle size, and other particle flow-related properties. The flow of coal through a system may deviate from its design via processes such as rat-holing, wherein materials are effectively trapped around the periphery of a container so that the new material flows through central hole in the container. Complex geometries in intermediate coal handling systems (e.g. belts, gates, etc.) can introduce mixing, partitioning, or other non-laminar flow patterns. Multiple techniques including discrete element modeling (DEM) and stochastic modeling may be used to simulate coal flow patterns through a bunker to address this process. Their techniques model mixing and rat-holing of coal through a bunker. This allows a user to calculate the residence time of individual coal particles through a system, and to model the overall composition of coal at the bunker outlet given the composition entering the bunker.

Discrete element and other particle-by-particle coal tracking methods may also be hampered by the scale of coal handling operations. Coal handling operations often operate on the scale of thousands of tons. A method for calculating the particle size distribution of ground coal may be used to estimate the particle size distribution and the number of particles in two typical coal handling vessels. For example, a live storage vessel with a capacity of 30,000 tonnes of 50-mm by 10-mm coal and a silo with a capacity 250 tonnes of 20-mm by 5-mm coal are shown in Table 1. The live storage vessel contains roughly 51 billion particles greater than 1 micron while the silo contains roughly 1.4 billion particles greater than 1 micron. Accurate modeling of billions of particles requires massive computational capacity.

TABLE 1

|  | Live Storage | Silo |
| --- | --- | --- |
| Capacity | 30,000 tonnes | 250 tonnes |
| Particle Size Distribution | 50-mm × 10-mm | 20-mm × 5 mm |
| Mean diameter $d_m$ (Rosin-Rammler) | 32.4 mm | 13.7 mm |
| n (Rosin-Rammler) | 1.9 | 2.2 |
| Total Particles in Vessel (>1 micron) | 51 billion | 1.4 billion |

Accurate modeling of billions of particles may use massive computational capacity. Further, accurate sampling of coal may also be a challenging procedure. Coal entering the coal handling system in component 204 may contain a top-size in the tens of millimeters. In order to analyze a sample of 50-mm (roughly 2 inches) top-size coal with an accuracy of 0.2 wt. % ash, a minimum sample mass of 170 kg must be collected. For 22.4-mm (roughly ¾ inch) top-size coal, the mass must be at least 32 kg. If samples are taken with less than the recommended mass, the result is high sample-to-sample variance in coal properties. In many cases, the noise caused by the variance will dwarf the signal caused by fluctuating coal properties. Pulverized-coal and cyclone-fired power plants employ one or more mills to crush the coal down to an appropriate size for combustion. Samples collected at later stages in these coal handling systems are therefore finer in particle size and require less mass to accurately represent the overall lot. A 2.8-mm top-size coal (⅛ inch) requires only 0.65 kg (just over 1 pound) minimum mass.

From component 204, coal that has been delivered to a coal-fired power plant may be analyzed using a Full Stream Elemental Analyzer (FSEA) 206 for sorting and blending. FSEA 206 may be positioned in such a way that it continuously analyzes the entire stream of coal in a given coal handling component, typically a belt. Regular sampling of the coal may be rendered unnecessary; the entire coal stream is analyzed over time. Sensors 104, monitoring system 110 and database 112 of FIG. 1 may be understood as part of FSEA 206.

FSEA 206 provides input to Coal Tracker 208, which sorts coal feedstock into bins using, for example, trippers 108. FSEA 206 also provides data of feedstock properties to Combustion System Performance Indices (CSPI) 214, which may be an example of database 112.

Combustion System Performance Indices 214 and Coal Tracker 208 may be abbreviated as CSPI-CT and may also be understood as an energy system performance manager (ESPM). Coal Tracker 208 provides selected and blended coal feedstock to Boiler 210. In embodiments, Coal Tracker 208 establishes and maintains an inventory of coal starting at FSEA 206 and moving through the entire coal handling system, providing operators visualizations of coal properties at various locations in system 100. Because the program maintains an inventory of the fuel throughout the entire system, projections of future fuel quality for each burner can be calculated. An example of a representation of coal in live storage, or bins 106A-106F, that is created by Coal Tracker 208 is shown in FIG. 3.

Figure 3A:
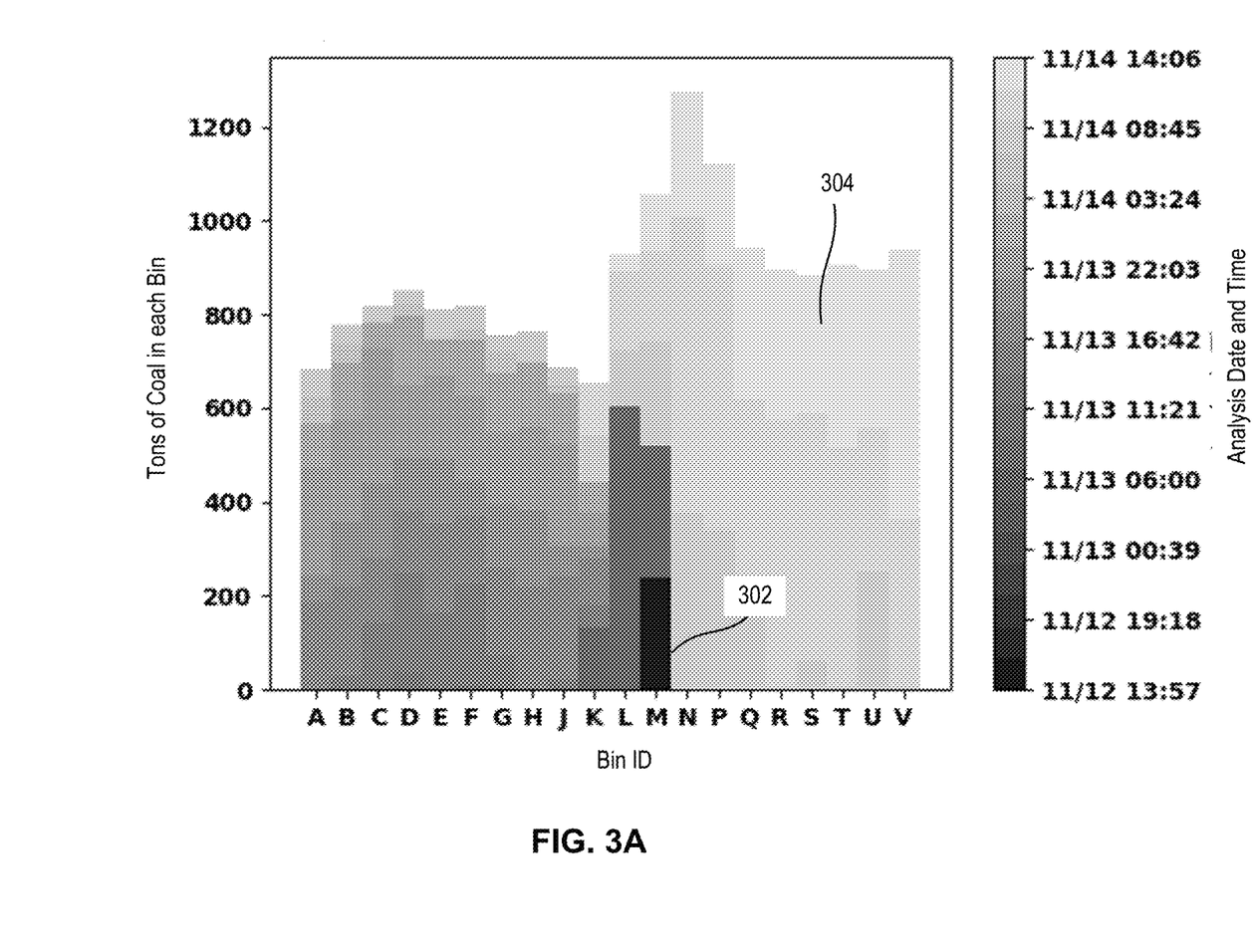
FIG. 3A is a graph showing feedstock sorted into bins according to sensed properties, in embodiments.

FIG. 3A is a graph showing a longitudinal cross-section of feedstock sorted into bins by date and time, in embodiments. A quantity of coal, or feedstock, in tons on the left y-axis is plotted for each of series of bins A-V on the x-axis. For example, bin J is shown as containing approximately 700 tons of coal while bin N is shown as containing over 1200 tons. Quantities of coal in each bin have different shades based on the time they were placed in the bin, as shown in the scale on the right side of FIG. 3A. In the example of FIG.

3A, feedstock has been sorted into bins A-V over a period of approximately two days. The darkest area 302 of coal, in bin M, was deposited at the earliest time period depicted while the lightest area 304, spread across bins K-B, was deposited at the latest time period depicted.

Figure 3B:
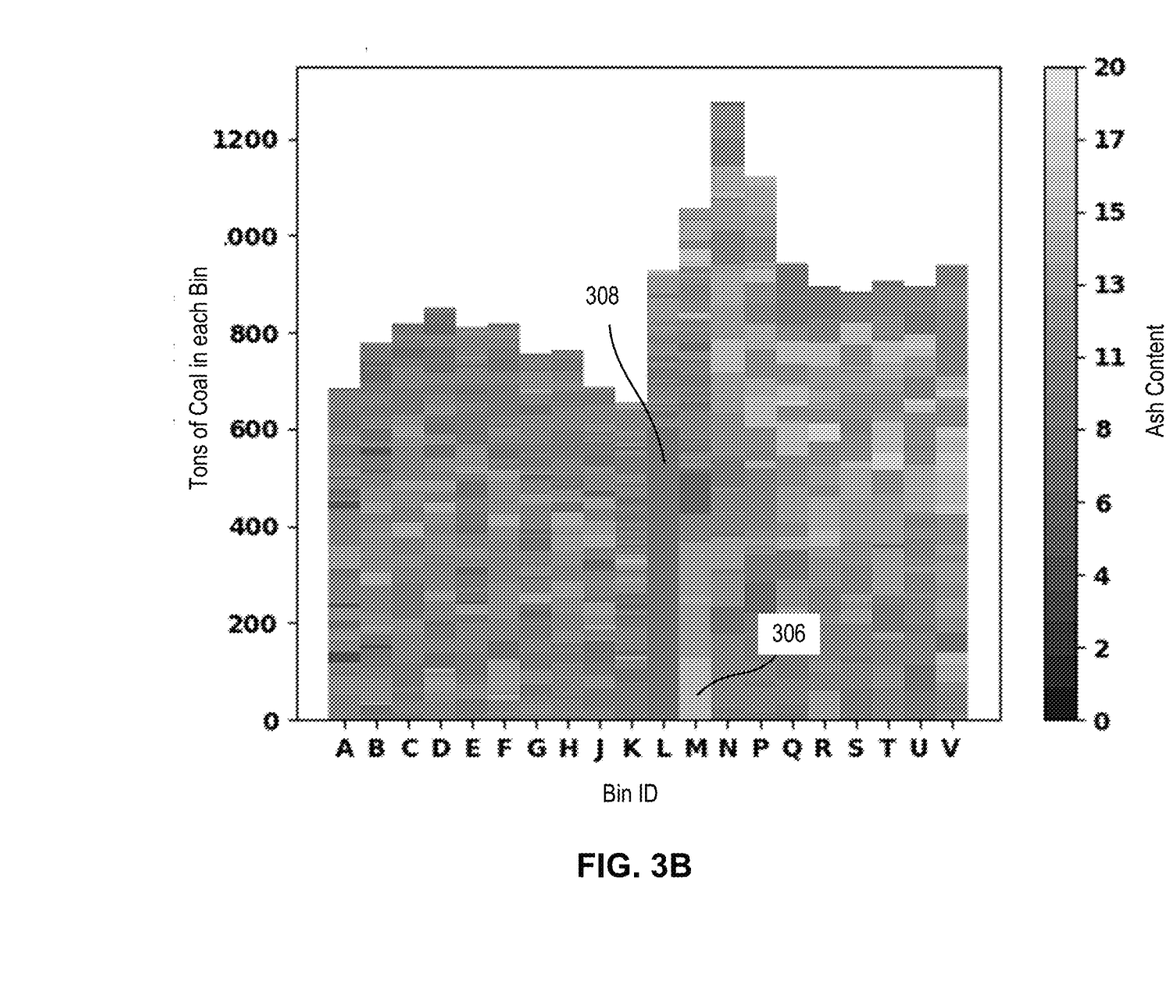
FIG. 3B is a graph showing a longitudinal cross-section of sorted feedstock according to a measured property, in embodiments.

FIG. 3B is a graph showing a longitudinal cross-section of sorted feedstock according to a measured property, in embodiments. As discussed above for FIG. 3A, a quantity of coal, or feedstock, in tons on the left y-axis is plotted for each of series of bins A-V on the x-axis. For example, bin J is shown as containing approximately 700 tons of coal while bin N is shown as containing over 1200 tons. Quantities of coal in each bin have different shades based on properties of interest of the coal over time, as shown in the scale on the right side of FIG. 3B, where the property of interest is ash content. Area 306 roughly corresponds to area 302 of FIG. 3A and has a high ash content of approximately 20 weight percent. Area 308 in bin L has a lower ash content of approximately 11 weight percent. An operator may use the graphs of FIGS. 3A and 3B to select feedstock for system 100 operation to optimize and tailor system performance while managing the capacity of each bin. For example, operators may use this information to improve the blending of fuels within the live storage system, as well as adjusting operations to accommodate fuel properties at the burner. Similar graphs may be displayed for other properties of interest. In addition, the display of the graphs of FIGS. 3A and 3B may change over time as feedstock is added to and removed from the bins.

By assuming a constant future flow rate of fuel through a burner, Coal Tracker 208 can project future as-fired fuel quality based on the current inventory of fuel in the coal handling system. In embodiments, projections may be performed up to 8 hours into the future.

Operating conditions and design parameters of Boiler 210 are provided to an AI based processing system that uses advanced phenomenological, statistical and Computational Fluid Dynamic (CFD) based algorithms to predict and minimize performance impacts (Database supported—fuel, deposits, operational data). The software platform will be a cloud-based or on-premises application which may have dedicated software and hardware for providing condition-based monitoring of system performance to provide information to plant operations and to machine learning algorithms.

Returning to FIG. 2, boiler 210 receives feedstock selected and blended by Coal Tracker 208. Further sensors, such as sensors 128 of FIG. 1, collect additional information from the processing of the feedstock in boiler 210, such as operating conditions and design parameters, as well as performance monitoring such as slagging, fouling, heat transfer, soot blowing, erosion and corrosion, for example.

Fluctuations in incoming fuel quality have a complex impact on the performance of burners in coal-fired boilers. The detection and quantification of these impacts may be difficult to evaluate due to changing operating conditions such as air/fuel ratio, temperature distribution, dryer performance, burner tilt, etc. Data provided by the sensors and analysis of system 100 may be used with neural network 212 or another machine learning system to increase the system's ability to optimize performance given available feedstocks and identify boiler conditions, coal properties and performance. The use of artificial intelligence based on neural network 212 also provides inputs to CSPI 214, which is part of an energy system performance manager (ESPM). The feedback from neural network 212 may be used to sort and blend feedstocks with certain properties and further enhance and streamline system performance.

Figure 4:
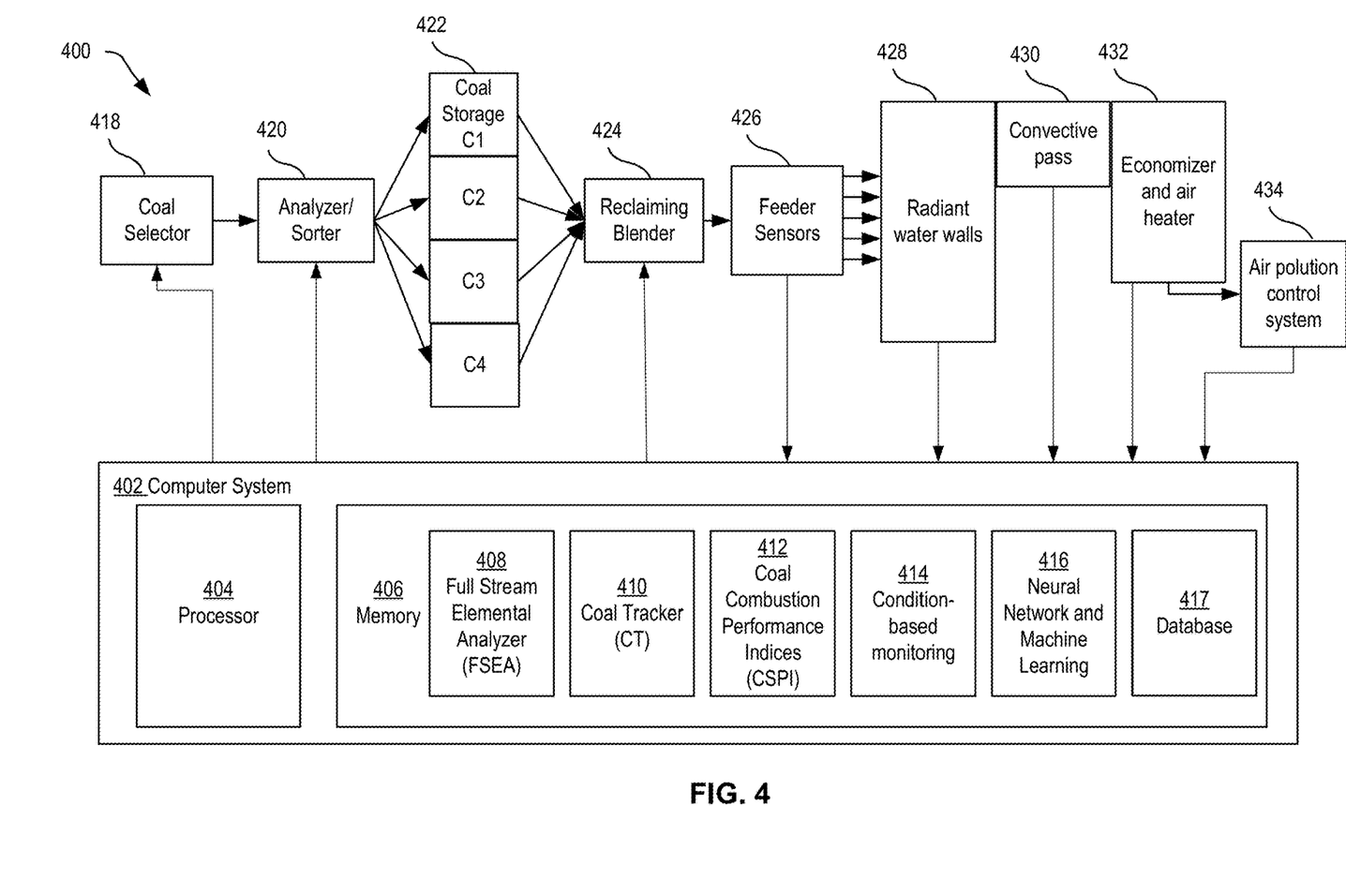
FIG. 4 is a schematic diagram of a system 400 for energy performance management, in embodiments

FIG. 4 is a schematic diagram of a system 400 for energy performance management, in embodiments. Computer system 402 includes processor 404 and memory 406. Memory 406 is non-transitory and stores computer-executable instructions for execution by processor 404. For purposes of illustration, separate modules are shown however, these are not limiting, and the systems and processes described herein may be combined into fewer modules or separated into more modules than what are shown and described. Further, processor 404 represents computer processing capabilities that may be located onsite with dedicated software and hardware for providing condition-based monitoring of system 400 or in a cloud-based platform, for example. Although specific processing modules are discussed herein, memory 406 may also store modules for other types of processing performed by processor 404, including graphical user interfaces, communications and other types of input and output, for example.

Feedstock properties measured by FSEA 408 are used with coal selector 418 and analyzer/sorter 420 to predict performance and operational parameters. Properties analyzed by FSEA 408 include moisture, heating value, sulfur, major and minor elements and trace elements. FSEA 408 may access database 417 of different type of coal that are categorized by mineral size, composition and abundance, as well as major, minor and trace elements, for example. Other information about coal feedstock may also be included in database 417.

Coal feedstock is sorted into a plurality of storage bins 422. Although four storage bins are shown, any number may be provided. The term "bins" may refer to separate vessels containing feedstock materials, and/or distinct locations within a single vessel that contain feedstock materials.

Coal tracker (CT) 410 and Coal Combustion Performance Indices (CSPI) 412 work with reclaiming blender 424 and feeder sensors 426 to track coal properties from delivery to burner using neural network and machine learning 416. Neural networks 416 for the prediction of plant performance may include, for example, a neuro-evolution algorithm to automatically generate the structure of the neural networks while training them on condition-based monitoring (CBM) 414 data collected from the power plant. The neuro-evolution technique is initiated with a large number of input parameters including fuel and plant operating parameters; as the algorithm progresses, it is possible for non-contributing parameters to be removed for better predictions. Depending on the linearity of the correlations between the parameters on both sides of the neural network (inputs and outputs), the structure and topology of the neural network varies: more nonlinearity leads to more complicated and deeper neural networks to be able to capture the relations between inputs and outputs. The depth of the neural networks helps in abstracting the information flowing from input to output. Nonlinearity also sometimes requires that information from past time-series operational data get injected in the information analysis done in the neural network structure. Past time-series information is offered to the neural networks through recurrent connections (which propagate forward data from previous timesteps) along with long short-term memory neurons which save information from past iterations to the current iteration and feed it through recurrent connections.

Radiant water walls 428, convective pass 430, economizer and air heater 432, and air pollution control system 434 represent a system for processing coal to produce energy. These components are shown for purposes of illustration. Embodiments disclosed herein may be applied to any system or method of processing a feedstock as long as the system provided inputs to CBM 414 and other components of computer system 402 for the purposes of monitoring and control.

In embodiments, the principles disclosed herein may be applied to any feedstock, for example, Residual Materials Feedstock (RMF). RMF is feedstock that may be derived from Municipal Solid Waste (MSW) plants after the higher value products have been removed. In embodiments, sensors 128 of FIG. 1 may use multi-gamma attenuation (MGA). This technology involves the use of the attenuation of multiple gamma rays as they pass through a feedstock. The attenuation of various gamma ray energies is related to the chemical and physical properties of the materials encountered. In embodiments, an MGA sensor has a Holmium-166 source that produces gamma rays at seven energy levels. The attenuation of those energy levels is detected using scintillation crystals after passing through an MSW feedstock in a feed pipe or on a belt which is dependent upon feedstock chemical and physical properties. The unique features of the technology include (1) multiple gamma emitters produced at several energy levels, (2) generates twenty MGA attenuation spectra per minute, (3) relatively inexpensive as compared to prompt gamma neutron activation analysis (PGNAA), and (4) utilizes neural network-based algorithms for rapid real-time measurement of feedstock properties as described above.

Embodiments disclosed herein may be used to determine the properties of RMF for use in a pyrolysis/gasification process to produce syngas, for example. The syngas can be used to produce fuel or chemicals. An on-line sensor using MGA information may determine properties of the RMF including the abundance and type of plastic, abundance of non-plastic, ash content, chlorine level, heating value, and others. The type and quantity of plastic components of RMF influences the ability to feed and process the feedstock. Different types of plastics have different gamma-ray attenuation coefficients indicating that the MGA sensor may produce a spectrum that allow for the ability to "fingerprint" using spectral matching augmented by neural network applications. Database 112 may store MGA spectral data for plastics and mixed plastics that can be used by neural networks to categorize feedstock using signal processing techniques such as peak detection, pattern recognition, and convolutional neural networks.

MGA sensors 128 may be used to optimize screening and sorting, provide input for blending, and combine that information with condition-based monitoring of plant performance to optimize plant operations. In addition, MGA sensors may be used in combination with other sensors at the plant that measure feedstock handling properties through imaging.

Figure 5:
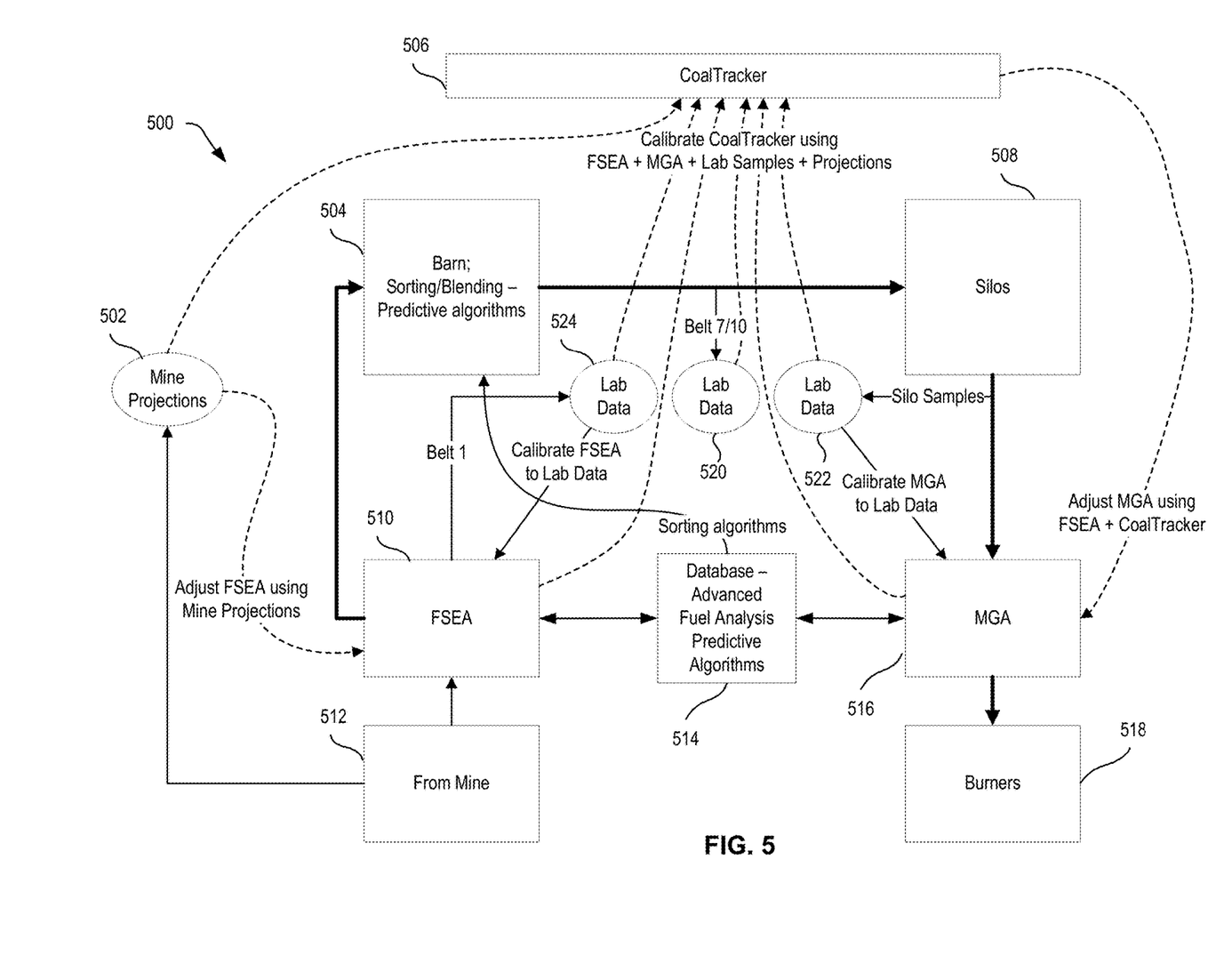
FIG. 5 is a flowchart illustrating a method of energy performance management, in embodiments.

FIG. 5 is a flowchart illustrating a method 500 of energy performance management incorporating principles described above, in embodiments. Specifically, FIG. 5 outlines a method for calibrating and adjusting a feedstock tracking system with one or more on-line sensors to improve the accuracy of both the feedstock tracking system and the on-line sensors. For purposes of illustration, the flowchart of FIG. 5 illustrates embodiments with regard to coal feedstock provided to a burner, but principles described herein may be applied to any feedstock for any energy producing facility. The feedstock tracking system CoalTracker 506 regularly updates its inventory of feedstock in the feedstock handling system using feedstock properties data analyzed by an on-line sensor such as FSEA 510, along with relevant operations data from, for example, Barn 504 and Silos 508. CoalTracker 506 can project feedstock properties in Barn 504 and Silos 508 at different times. Further, CoalTracker 506 uses a database 514 with advanced feedstock analysis and predictive algorithms to visualize the impacts of feedstock properties on plant performance in, for example, burners 518 or other process systems such as 428, 430, 432, and 434 discussed above with reference to FIG. 4.

Periodically, samples of feedstock may be obtained and analyzed to produce lab data 520, 522, and 524. Lab data 524 is typically used to calibrate on-line sensor FSEA 510. Lab data 522 is typically used to calibrate on-line sensor MGA 516. Calibrations of CoalTracker 506 are performed by comparing CoalTracker projections of feedstock properties to measurements of those same feedstock properties. Measurements of feedstock properties may come from lab data 520, 522, and 524. Measurements of feedstock properties may also come from database 514. Measurements of feedstock properties may also come from MGA 516. Measurements of feedstock properties may also come from mine 512 and mine projections 502.

Calibrations of CoalTracker 506 may be performed using any combination of measured feedstock properties from lab data 520, 522, and 524; database 514; MGA 516; and mine projections 502. Calibrations of FSEA 510 may be performed using any combination of measured feedstock properties from lab data 524; database 514; mine projections 502; and CoalTracker 506 in conjunction with database 514; Lab data 520 and 522; and MGA 516. Calibrations of MGA 516 may be performed using any combination of measured feedstock properties from lab data 522; database 514; and CoalTracker 506 in conjunction with mine projections 502; FSEA 510; database 514; and Lab data 520 and 524.

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated: (a) the adjective "exemplary" means serving as an example, instance, or illustration, and (b) the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A method of processing feedstock for a facility providing an output, the method comprising:
   feeding a stream of the feedstock from an input location to a sorting location, wherein the sorting location comprises a plurality of bins;
   detecting a plurality of measurable properties of the stream of the feedstock using one or more sensors comprising a prompt gamma neutron activation analysis (PGNAA) sensor, wherein the PGNAA sensor continuously detects the plurality of measurable properties as the stream of the feedstock is fed from the input location to the sorting location;
   analyzing the plurality of measurable properties of the stream of the feedstock in relation to a database of performance indicators, using one or more computer processing devices having access to the database of performance indicators, wherein the analysis continuously correlates the plurality of measurable properties with the database of performance indicators to characterize quantities of one or more unmeasured properties in relation to the stream of the feedstock;

sorting the quantities of the stream of the feedstock into one or more of the plurality of bins based on the plurality of measurable properties associated with the quantities of feedstock to provide a selectively stored feedstock portion in each of the plurality of bins;

selecting a quantity of each of the selectively stored feedstocks from the plurality of bins based on the plurality of measurable properties to provide a selected feedstock having one or more desired properties;

processing the selected feedstock to generate energy;

sensing a plurality of actual performance properties of a performance of the facility when processing the selected feedstock, wherein the sensing comprises condition-based monitoring of the plurality of actual performance properties using one or more sensors comprising a multi-gamma attenuation (MGA) sensor; and providing the plurality of actual performance properties as feedback to the one or more computer processing devices, wherein the feedback is used for refining further detecting, analyzing, and sorting of the stream of the feedstock.

2. The method of claim 1, wherein analyzing further comprises processing the plurality of measurable properties and the plurality of actual performance properties using a machine learning algorithm to predict a performance of the facility.

3. The method of claim 2, wherein analyzing further comprises determining operational parameters of the facility.

4. The method of claim 3, wherein the machine learning algorithm further comprises a neural network.

5. The method of claim 4, wherein the condition-based monitoring is continuous and the feedback provided to the one or more computer processing devices is continuous, such that analyzing the entire stream of the feedstock further comprising accessing a database of feedstock properties that is continuously refined from the continuous feedback.

6. The method of claim 4, wherein the neural network comprises a neuro-evolution algorithm.

7. The method of claim 6, wherein the neuro-evolution algorithm trains the neural network to remove non-contributing parameters.

8. The method of claim 1, wherein selecting the quantity of each of the selectively stored feedstocks further comprises blending two or more of the selectively stored feedstocks.

9. The method of claim 8, wherein blending two or more of the selectively stored feedstocks further comprises adding other materials to provide the selected feedstock.

10. The method of claim 1, wherein the feedstock comprises coal.

11. The method of claim 1, wherein the feedstock comprises residual materials feedstock.

12. The method of claim 1, further comprising monitoring one or more operating parameters at one or more locations in the facility.

13. The method of claim 1, wherein processing the selected feedstock to generate energy comprises feeding the selected feedstock to a processing system chosen from the group consisting of a boiler, an incinerator, a gasification system, a gas cleaning system, a pyrolysis system, or an energy conversion system.

14. The method of claim 1, wherein the stream of the feedstock is continuously fed from the input location to the sorting location on a belt, wherein the PGNAA sensor is located between the input location and the sorting location, and wherein the entire stream of the feedstock fed from the input location to the sorting location is detected and analyzed over a period of time.

15. A method of processing feedstock for a facility providing an output, the method comprising:

providing a coal feedstock at an input location;

feeding a stream of the coal feedstock from the input location to a sorting location on a conveyor or belt, wherein the sorting location comprises a plurality of bins;

detecting a plurality of measurable properties of the stream of the coal feedstock using one or more sensors comprising a prompt gamma neutron activation analysis (PGNAA) sensor, wherein the detecting occurs while the coal feedstock is fed from the input location to the sorting location on the conveyor or belt, such that the PGNAA sensor continuously detects the plurality of measurable properties of the stream of the coal feedstock;

analyzing the plurality of measurable properties of the stream of the coal feedstock using one or more computer processing devices having access to a database of performance indicators, wherein the analysis continuously characterizes quantities of one or more predicted performance properties in relation to the stream of the coal feedstock based on a correlation between the plurality of measurable properties and the database of performance indicators;

sorting the quantities of the stream of the coal feedstock into one or more of the plurality of bins to provide a selectively stored coal feedstock portion in each of the plurality of bins, wherein the sorting of the stream of the coal feedstock into each of the plurality of bins is based on the plurality of measurable properties associated with the quantities of coal feedstock at that particular portion of the stream of the coal feedstock;

selecting and blending a quantity of the selectively stored coal feedstocks from at least two of the plurality of bins to provide a blended coal feedstock, wherein the selecting and blending is based on the plurality of measurable properties of each of the selectively stored coal feedstocks to provide the blended coal feedstock;

processing the blended coal feedstock to generate energy;

sensing one or more actual performance properties of a performance of the facility when processing the blended coal feedstock, wherein the sensing comprises condition-based monitoring of the one or more actual performance properties using one or more sensors comprising a multi-gamma attenuation (MGA) sensor; and providing a continuous feedback of the one or more actual performance properties to continuously optimize the database of performance indicators, such that the continuously optimized database of performance indicators is used for further detecting, analyzing, and sorting of the stream of the coal feedstock.

16. The method of claim 15, wherein analyzing further comprises processing the plurality of measurable properties and the plurality of predicted performance properties using a machine learning algorithm to predict a performance of the facility.

17. The method of claim 16, wherein analyzing further comprises determining operational parameters of the facility.

18. The method of claim 17, wherein the machine learning algorithm further comprises a neural network.

19. The method of claim 18, wherein the neural network comprises a neuro-evolution algorithm.

20. The method of claim 19, wherein the neuro-evolution algorithm trains the neural network to remove non-contributing parameters.

* * * * *